United States Patent
Nonaka

(10) Patent No.: US 10,275,729 B2
(45) Date of Patent: *Apr. 30, 2019

(54) WORKFLOW PROCESS CONSOLIDATION

(71) Applicant: International Business Machines Corporation, Armonk, NY (US)

(72) Inventor: Takaaki Nonaka, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1129 days.

This patent is subject to a terminal disclaimer.

(21) Appl. No.: 14/510,099

(22) Filed: Oct. 8, 2014

(65) Prior Publication Data
US 2015/0095096 A1   Apr. 2, 2015

Related U.S. Application Data

(63) Continuation of application No. 10/628,029, filed on Jul. 25, 2003, now Pat. No. 8,880,418.

(30) Foreign Application Priority Data

Jul. 26, 2002  (JP) ................................. 2002-218655

(51) Int. Cl.
*G06Q 10/06* (2012.01)
*G06Q 10/10* (2012.01)

(52) U.S. Cl.
CPC . *G06Q 10/06316* (2013.01); *G06Q 10/06311* (2013.01); *G06Q 10/10* (2013.01)

(58) Field of Classification Search
USPC ....... 705/8, 7, 1, 7.27, 7.13, 7.11, 7.26, 301; 718/102
See application file for complete search history.

(56) References Cited

U.S. PATENT DOCUMENTS 6,816,902 B1 * 11/2004 Bandat et al. ................ 709/226

FOREIGN PATENT DOCUMENTS

| JP | 10105623 | 4/1998 |
|----|----------|--------|
| JP | 10134127 | 5/1998 |
| JP | 10137763 | 5/2000 |
| JP | 2000-222508 | 8/2000 |

OTHER PUBLICATIONS

Deborin, E., et al. "Continuous Business Process Management with HOLOSOFX BPM Suite and IBM MQSeries Workflow", May 2002, ibm.com/redbooks (Year: 2002).*

(Continued)

*Primary Examiner* — Mark A Fleischer
(74) *Attorney, Agent, or Firm* — Steven Greenberg, Esq.; Shutts & Bowen LLP

(57) ABSTRACT

A workflow server is connected with operating computer terminals through a network to manage workflow. The workflow server consolidates information necessary for processing multiple consecutive nodes to be processed by one participant operating one of the operating computer terminals, and sends the consolidated information to the operating computer terminal concerned.

7 Claims, 19 Drawing Sheets

(56) References Cited

OTHER PUBLICATIONS

Dewan, R., Seidmann, A., Walter, Zhiping; "Workflow Optimization through Task Redesign in Business Information Processes", 1998, IEEE Computer Society, Proceedings of the Thirty-First Annual Hawaii International Conference on System Sciences—vol. 1-vol. 1, (Year: 1998).*
IBM Global Business Service; Intro to Formwave, May 22, 2008.
"R.21 vs. CNAP Workflow Pro," Notes/Domino Magazine, No. 46, Aug. 2000, pp. 96-101.
"Cosminexus Portal Framework: Hmanet 21/ESS," HITAC, No. 419, Apr. 1, 2002, pp. 3-6.

* cited by examiner

WORKFLOW DEFINITION TABLE

| WORKFLOW DEFINITION ID | IDENTIFIER OF WORKFLOW DEFINITION |
|---|---|
| TITLE | WORKFLOW TITLE |
| CONSOLIDATION FLAG | METHODS OF PROCESSING ONE PARTICIPANT'S CONTINUOUS ACTIVITIES: "0" FOR INDIVIDUAL PROCESSING OF EACH NODE, AND "1" FOR CONSOLIDATING NODE INFORMATION AND SENDING THE SAME TO PARTICIPANT TO PROCESS NODES AT A TIME |
| FIELD DEFINITION *1 | DEFINITION OF EACH FIELD |
| PROCESS DEFINITION *1 | DEFINITIONS INCLUDING PROCESS NAME, FLOW DIRECTION OF WORKFLOW, AND OPERATIONS OF WORKFLOW PERFORMED BY WORKFLOW ENGINE UPON SELECTION OF THE PROCESS |
| NODE DEFINITION *1 | DEFINITION OF EACH NODE (NODE NAME, SPECIFICATION OF PARTICIPANT, ACCESS PERMISSION TO EACH FIELD AT NODE, LIST OF SELECTABLE WORK ITEMS, FORM LAYOUT DEFINITION UNIQUE TO NODE) |
| PATH DEFINITION *1 | NODE CONNECTION INFORMATION |
| STANDARD LAYOUT | LAYOUT DEFINITION OF STANDARD FORM |
| LAYOUT FOR THE TIME OF ONE PARTICIPANT'S CONTINUOUS ACTIVITIES | DEFINITION OF FORM LAYOUT USED WHEN ONE PARTICIPANT PERFORMS CONSECUTIVE ACTIVITIES |

FIG. 3A

WORKFLOW INSTANCE DATA TABLE

| RECORD ID | IDENTIFIER OF WORKFLOW INSTANCE |
|---|---|
| WORKFLOW DEFINITION ID | IDENTIFIER OF WORKFLOW DEFINITION |
| SLIP NUMBER | SLIP NUMBER |
| FORM ORIGINATOR ID | FORM ORIGINATOR ID |
| PREVIOUS PARTICIPANT ID | IMMEDIATELY PRECEDING PARTICIPANT ID |
| CURRENT PARTICIPANT ID | CURRENT PARTICIPANT ID |
| NODE ID | CURRENT NODE ID |
| SLIP DATA *1 | DATA ON EACH FIELD |

FIG. 3B

PROCESS HISTORY TABLE

| WORKFLOW DEFINITION ID | IDENTIFIER OF WORKFLOW DEFINITION |
|---|---|
| SLIP NUMBER | SLIP NUMBER |
| CURRENT PARTICIPANT ID | CURRENT PARTICIPANT ID |
| NODE ID | CURRENT NODE ID |
| PROCESS HISTORY *1 | RECORD FOR EACH NODE SET OF INFORMATION (PARTICIPANT ID, PARTICIPANT NAME, SELECTED WORK, NODE WHERE WORK WAS PROCESSED, DATE AND TIME OF PROCESSING, PROCESSING RESULT (ERROR/NORMAL)). |

FIG. 4A

ONE PARTICIPANT'S CONTINUOUS WORKING DATA TABLE

| RECORD ID | IDENTIFIER OF WORKFLOW INSTANCE |
|---|---|
| WORKFLOW DEFINITION ID | IDENTIFIER OF WORKFLOW DEFINITION |
| SLIP NUMBER | SLIP NUMBER |
| CURRENT PARTICIPANT ID | CURRENT PARTICIPANT ID |
| NODE ID | CURRENT NODE ID |
| ROUTE INFORMATION *1 | RANGE OF ONE PARTICIPANT'S CONTINUOUS ACTIVITIES |
| FIELD ACCESS PERMISSION *1 | FIELD ACCESS PERMISSION |
| WORK ITEM TABLE *1 | LIST OF WORK ITEMS SELECTABLE FOR EACH NODE INCLUDED IN ROUTE INFORMATION |
| SLIP DATA *1 | USER INPUTTED DATA ON EACH TABLE |
| WORK *1 | WORK SELECTED BY USER |

FIG. 4B

USER INFORMATION TABLE

| PARTICIPANT ID | IDENTIFIER OF PARTICIPANT |
|---|---|
| NAME | NAME OF PARTICIPANT |
| SUPERIOR | PARTICIPANT ID AS SUPERIOR OF THE PARTICIPANT |

FIG. 4C

CONDITION (1)

CONDITION (2)

DIRECTION OF MOVEMENT OF FLOW
RESULTING FROM WORK $E_O$

CONDITION (3)

DIRECTION OF MOVEMENT OF FLOW
RESULTING FROM WORK $E_O$

FIG. 9A
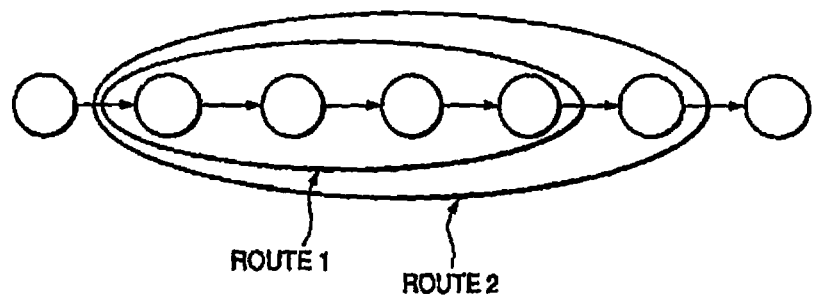
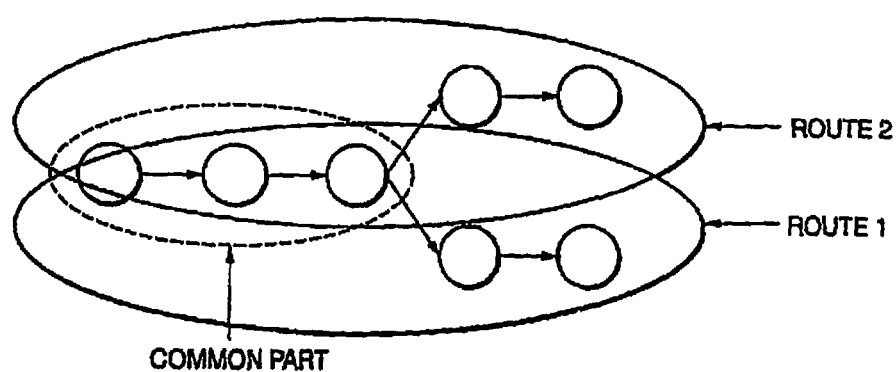
FIG. 9B
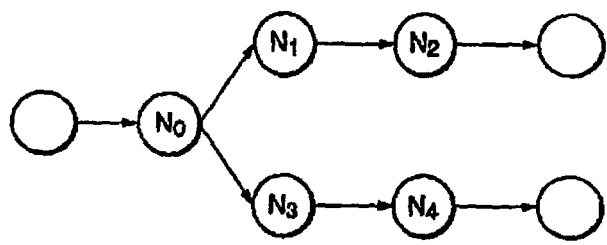
FIG. 9C

| NODE | WORK ITEM |
|---|---|
| A | FILL IN FORM RETURN |
| B | APPROVE RETURN |

FIG.11

WORKFLOW PROCESS CONSOLIDATION

CROSS-REFERENCE TO RELATED APPLICATIONS

This application is a Continuation of U.S. application Ser. No. 10/628,029, filed Jul. 25, 2003, now U.S. Pat. No. 8,880,418, which claims priority to Japanese Application No. 2002-218655, filed Jul. 26, 2002, which are incorporated herein by reference in their entirety.

TECHNICAL FIELD OF THE INVENTION

The present invention relates to an improvement in workflow in an office environment, and more particularly, to a workflow system for simplifying a participant's activities in a workflow.

BACKGROUND OF THE INVENTION

Computer application workflow systems define a sequence of business procedures involving multiple workers and for managing an actual flow of a business process. Workflow systems computerize or electronically perform management of a business according to the business procedures. The introduction of a workflow system into a business can enhance efficiency. From the viewpoint of improving paperwork efficiency in an office, lowering the cost of space for file cabinets, environmental issues, and so on, it is beneficial to construct a paperless form processing system in which, for example, a shipping process, is electronically performed. However, the actual shipping process is complicated, and because of the need to handle exceptions, a paperless form processing system has not become widely used or accepted.

To offer a solution to this problem, FORMWAVE (trademark of International Business Machines Corp.) is now commercially available from IBM as an electronic application system capable of easily designing and managing a complicated workflow process. FORMWAVE uses a workflow engine to establish and manage a complicated route in a series of activities from fill-in of a form to approval and data storage of the form in each of various applications and business approval processes. This enables quick and accurate processing, thereby improving productivity in each division or organization.

For example, prior art of such a workflow system, Japanese unexamined patent publication No. 10-105623, discloses a technique for dividing and registering workflow definition information in order to commonly use the divided registration information among multiple workflows. This technique can provide an efficient, fine-grained management of workflow processes by changing, terminating, and restarting some of the processes. Japanese unexamined patent publication No. 10-134127 also teaches a technique for giving advance notice to a worker working on currently circulated matter and workers scheduled to take over the circulated matter at the time of collection of the stagnated circulation to prevent each worker from getting confused in the course of their work. Further, Japanese unexamined patent publication No. 2000-137763 discloses a technique for monitoring elapsed time from the moment that an electronic document is sent to a node so that execution of business activities will not be delayed even when a user or participant currently in charge of work is forced by uncontrollable circumstances to temporarily terminate his or her work. In this technique, if an allocated processing time has elapsed without completion of the work, the electronic document concerned will be automatically skipped.

In current workflow systems, if a participant is also their own boss, the participant will need to work on the same form several times to give approval in the correct succession. For example, suppose that in a department to which a form originator A belongs, a person B serves as both the subsection chief and the section chief and a person C serves as the department manager. In this case, the person B serving as both the subsection chief and the section chief has to give approval to the same form twice in succession despite no change to the form. Generally, once a person makes a determination on a form, the person is not likely to change that determination at the respective nodes. In other words, if the person makes the same determination, the work should only need to be done once. However, existing workflow systems require repetition of the same work multiple times for respective nodes.

Further, Suppose that the nodes to be processed by one participant are in consecutive order. In this case, if work on the first node can be adopted for the following nodes, that is, if work on the first node is also applicable to the following nodes (when work defined to be treated the same as the work on the first node is applied even if the same work is not applicable), it can be presumed that the work on the first node will be performed on the following nodes. Such a processing method has already been proposed. In the proposed method, however, the participant can only reference the information provided at the first node. The participant's entries of information are also restricted to the information capable of being input into the first node. Therefore, if fields to which reference or changes are allowed vary from post to post, for example, if access permission to information is different between respective nodes, such as a case where the authorization to personnel information is different between the subsection chief and the section chief, the participant may not be able to reference information necessary for decision making. In such a case, the participant also cannot change or enter necessary information, and this may cause an error at an intermediate node.

The present invention herein solves the above-mentioned technical problems, and it is an object thereof to complete work on consecutive nodes to be processed by one participant at a time instead of repeating the same work multiple times as required in the conventional systems.

SUMMARY OF THE INVENTION

In attaining the object and according to the invention, when nodes to be processed by one participant are in consecutive order and a form reaches the first node, a workflow engine consolidates information necessary for the participant's determination on the consecutive nodes, and sends the consolidated information to the participant. The participant receiving the information makes a decision based on the information, and sends results of work to the workflow engine. The workflow engine performs necessary processing for each node based on the information sent from the participant to advance the workflow. The sequence of the operations allow the participant to complete work at a time instead of repeating the same work multiple times as required in the conventional. A workflow system to which the invention is applied includes operating computer terminals executing a workflow and a workflow server connected with the operating computer terminals through a network to manage the workflow. The workflow server consolidates information necessary for processing multiple consecutive nodes to be processed by one participant operating one of the operating computer terminals and sends the consolidated information to the operating computer terminal.

When a form to be circulated in the workflow reaches the first one of the multiple nodes to be processed by one participant, the workflow server may consolidate information necessary for the participant's determination and send the consolidated information to the operating computer terminal. In this case, the operating computer terminal sends the workflow server results of work performed by the same participant based on the information sent from the workflow server. The workflow server may also perform individual processing on each of the multiple nodes based on the results of work performed by the participant and sent from the operating computer terminal to advance the workflow.

On the other hand, a workflow server to which the invention is applied is connected with multiple computer terminals to manage a workflow. The workflow server includes storage means for storing the definition of nodes assigned to respective participants performing a workflow, consolidation range determining means for determining the range of consolidating multiple consecutive nodes to be processed by one participant in the workflow, acquisition means for acquiring from the storage means work items selectable for each node within the consolidation range determined by the consolidation range determining means, and providing means for consolidating the work items acquired by the acquisition means to provide the participant with the consolidated information.

The definition of nodes may include information relating to access permission to each field at each of the nodes. The workflow server may further include highest-level access permission acquiring means for acquiring from the storage means the highest level of access permission to each field within the consolidation range determined by the consolidation range determining means. The storage means may store the layout definition of a form used for the time of one participant's continuous activities, and the providing means may provide the participant with a form formatted based on the form layout definition acquired from the storage means and the field access permission acquired from the highest-level access permission acquiring means.

From another point of view, the invention provides a workflow engine connected with multiple computer terminals to manage a workflow. The workflow engine includes consolidation range determining means for determining the range of consolidating multiple consecutive nodes to be processed by one participant in the workflow, access permission setting means for setting access permission to each field at each node within the consolidation range determined by the consolidation range determining means, selectable work acquiring means for acquiring work items selectable for each node within the consolidation range determined by the consolidation range determining means, form generating means for generating a form based on the access permission set by the access permission setting means and the work items acquired by the selectable work acquiring means, and form sending means for sending the participant the form generated by the form generating means.

The consolidation range determining means may employ several methods of determining the consolidation range. For example, when there are multiple work items selectable for a certain node, if one of routes determined for respective work items contains all other routes, the other routes contained in the one route may be determined as the consolidation range. If routes determined for respective work items have no inclusion relationship with one another, common part of the routes may be determined as the consolidation range. Further, the access permission setting means may set the highest level of access permission of the participant to each field defined on the form for each node as the access permission upon consolidation.

In still another aspect, the invention is directed to a workflow process consolidation method for consolidating work items for each of multiple nodes assigned in a workflow to one participant operating a computer terminal connected to a network. This method includes a step of determining the range of consolidating multiple consecutive nodes to be processed by the participant based on a workflow definition stored in a storage device, a step of determining the highest level of access permission to each field within the consolidation range from the workflow definition, a step of acquiring work items selectable for each node within the determined consolidation range from the workflow definition stored in the storage device, a step of acquiring the layout definition of a form to be provided to the participant from the workflow definition, and a step of generating a form as consolidated information based on the access permission and the layout definition, that is, consolidating the acquired selectable work items, generating consolidated information, and providing the participant with the consolidated information through the network.

The method may include as post processing a step of receiving through the network results of work performed by the participant on the consolidated information, and a step of storing in the storage device the participant's inputted field values and the participant's selected work from the received results of work.

In yet another aspect, the invention is directed to programs to instruct a workflow engine as a computer to perform workflow functions. The programs to which the invention is applied make a computer, which manages a workflow executed by multiple computer terminals connected to a network, perform a function for determining the range of consolidating multiple consecutive nodes to be processed by one participant based on a workflow definition stored in a storage device, a function for determining the highest level of access permission to each field within the consolidation range from the workflow definition, a function for acquiring work items selectable for each node within the determined consolidation range from the workflow definition stored in the storage device, a function for acquiring the layout definition of a form to be provided to the participant from the workflow definition, a function for generating a form to be provided to the participant based on the access permission and the layout definition and consolidating the acquired selectable work items to generate consolidated information, a function for sending the generated form to the participant, a function for receiving results of work performed by the participant on the form, and a function for storing field values and selected work from the received results of work in a working data table of the storage device.

The programs may be preinstalled in the workflow engine as the computer before the workflow engine is delivered to a customer, or may be distributed in the form of a storage medium containing the programs readable by the computer to execute the programs. The form of the storage medium may be a floppy disk, CD-ROM, or the like. The programs are read by a floppy disk drive, CD-ROM drive, or the like, stored in a flash ROM or the like, and executed by the computer. Further, the programs may be distributed by a program transmitter through a network. The program transmitter may be provided in a server on the host side, including a memory for storing the programs and program sending means for providing the programs through the network.

BRIEF DESCRIPTION OF THE DRAWINGS

A preferred embodiment of the invention will now be described in more detail, by way of example only, with reference to the accompanying drawings, in which:

FIG. 3A illustrates a Workflow Definition Table showing information stored in such and FIG. 3B illustrates a Workflow Instance Data Table showing information stored in such;

FIG. 4A illustrates a Process History showing information stored therein, FIG. 4B illustrates a One Participant's Continuous Working Data Table showing information stored therein, and FIG. 4C illustrates a User Information Table showing the information stored therein;

FIG. 6 is a diagram for explaining a flow of work other than form fill-in;

FIGS. 7A, 7B, 7C, and 7D contains illustrations explaining the definition of relative ranks of nodes and the direction of movement of the nodes;

FIGS. 9A, 9B, and 9C contains illustrations for giving supplementary explanations of the conditions (1) to (3);

FIG. 11 shows an example of a work item table for nodes to be processed by one participant;

DETAILED DESCRIPTION OF THE INVENTION

Figure 1:
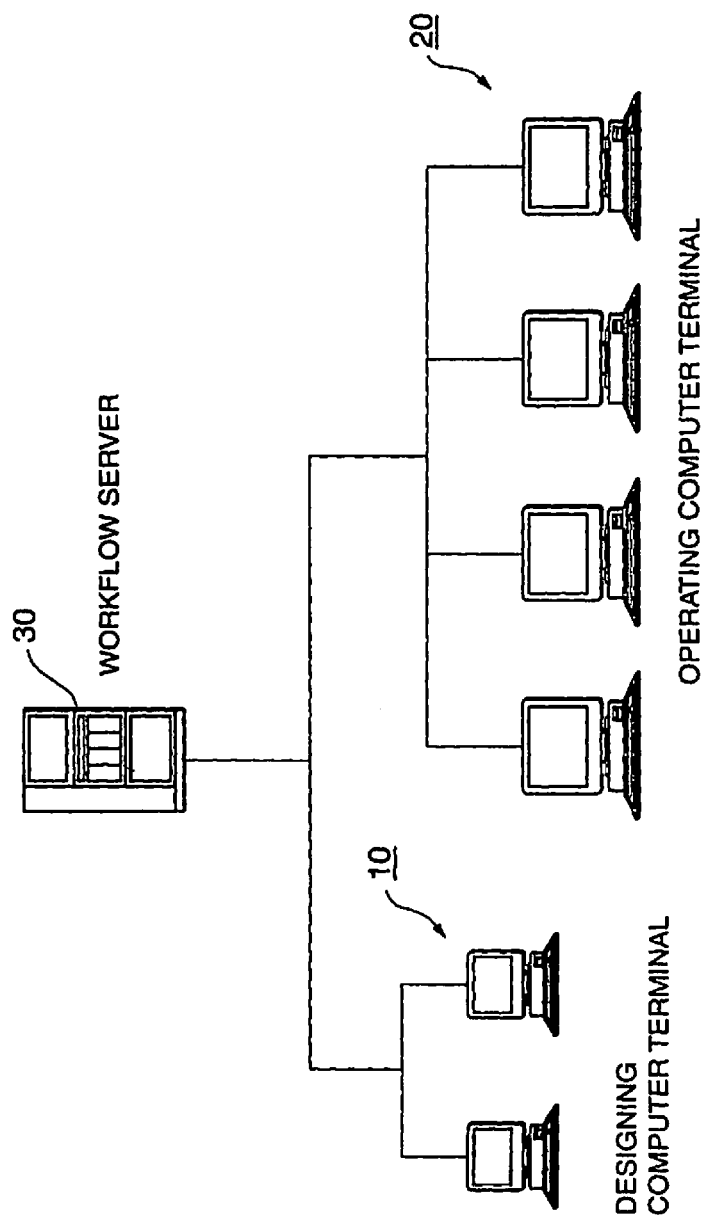
FIG. 1 is a schematic diagram showing a configuration of a workflow system to which the embodiment is applied.

FIG. 1 is a schematic diagram showing a configuration of a workflow system to which an embodiment of the present invention is applied. In the embodiment, the workflow system includes workflow designing computer terminals 10, workflow operating computer terminals 20 provided for respective participants (persons in charge) doing their work, and a workflow server 30 storing various programs and tables for executing a workflow. The designing computer terminals 10, the operating computer terminals 20, and the workflow server 30 are connected to one another to form a network.

A workflow designing feature is introduced into each of the designing computer terminals 10, and a definition feature for realizing business processes in the workflow system is provided in the designing computer terminals 10. A person or persons defining business processes (process designer or designers) use the designing computer terminals 10 to define business process procedures for the workflow system. The operating computer terminals 20 are provided with features for performing predetermined work, and deployed for respective participants such as a form originator, a subsection chief, a section chief, and a manager. The business process defining person uses the designing computer terminal 10 to enter his or her identification information and connect the workflow system. Then the business process defining person uses the workflow designing feature to design the flow of a target business process and data structure for the process.

In the workflow system to which the embodiment is applied, nodes as units of predetermined business activities to be assigned to persons in charge (participants) are linked together in the order of predetermined business activities, that is, by a path indicating a connection between business activities, thus defining a workflow. It can be assumed, for example, that a single data definition is referenced at all the nodes and necessary data passing between activities is done along the path. The multiple operating computer terminals 20 may correspond to multiple nodes, or multiple node activities may be performed on a single operating computer terminal 20. A node is a unit of work in a workflow business process, and it does not necessarily correspond to an operating computer terminal 20.

Also suppose that nodes to be processed by one participant (for example, one person operating one of the operating computer terminals 20) are in consecutive order. In other words, for example, supposes that there are a subsection chief node and a section chief node, and in certain business activities one person serves as both the subsection chief and the section chief. In this case, when a form used in the workflow reaches the first node (e.g., the subsection node), the workflow server 30 consolidates information necessary for the participant's determination on the consecutive nodes. The workflow server 30 creates the consolidated information as a new form, for example, and sends the consolidated information through the network to the operating computer terminal of the participant (the person concurrently holding the posts). The participant (the person concurrently holding the posts) of the operating computer terminal 20 receiving this information (e.g., new form) makes a decision based on the information, and sends results of his or her work to the workflow server 30 through the network. The workflow server 30 receiving the results of the work uses the results of the work to perform processing necessary for each of the consolidated nodes and advances the workflow to the following node. The consolidated information may also be another kind of information such as certain text information, rather than a form.

Figure 2:
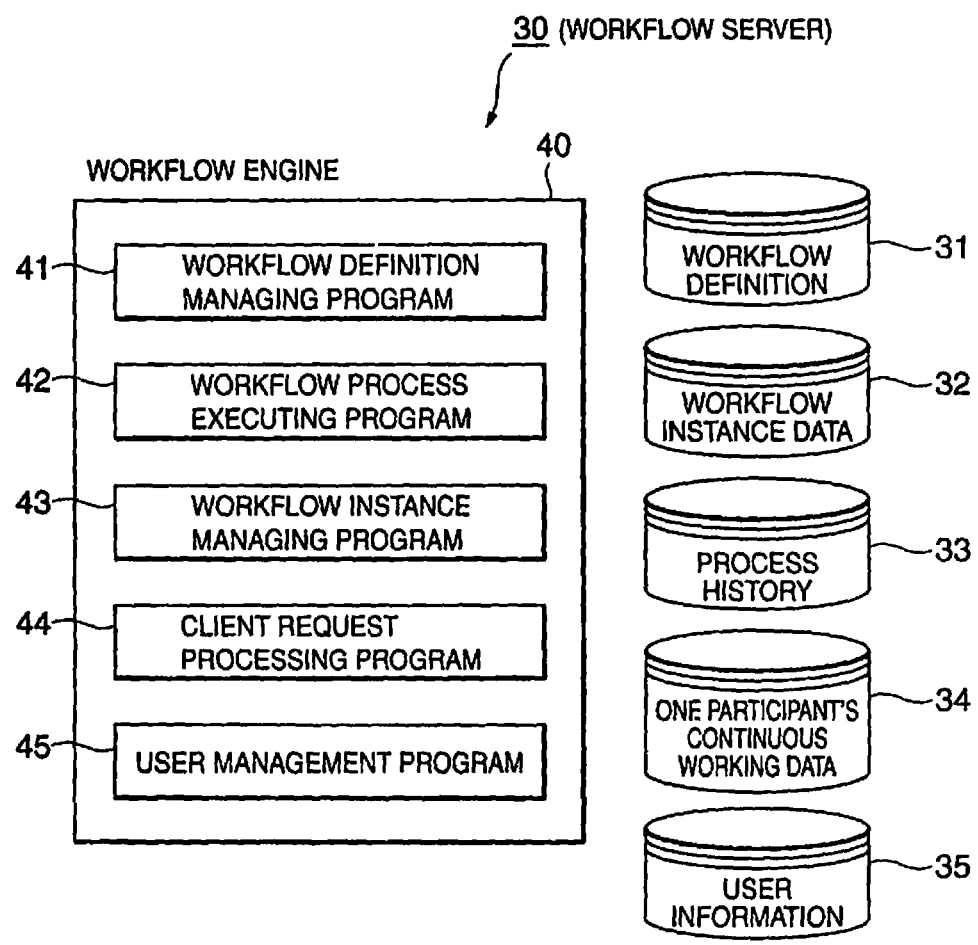
FIG. 2 is a diagram showing a configuration of a workflow server.

FIG. 2 is a diagram showing a configuration of the workflow server 30. The workflow server 30 includes, as a workflow engine 40, a workflow definition managing program 41, a workflow process executing program 42, a workflow instance managing program 43, a client request processing program 44, and a user management program 45. The workflow server 30 also includes, in a storage device storing various kinds of information, a workflow definition table 31, a workflow instance data table 32, a process history table 33, a one-participant's continuous working data table 34, and a user information table 35. In FIG. 2, the storage device storing these kinds of information is provided in the workflow server 30, but it may be placed anywhere in the network.

The workflow definition managing program 41 manages workflows defined by the process designer or person defining business processes by storing the workflows in the workflow definition 31. Each of the workflows defined is identified by its workflow definition ID. The registration of a new definition or modification of an existing definition is managed through the workflow definition managing program 41 using the workflow definition ID. On the other hand, when a participant operating one of the operating computer terminals 20 wants to create a new process, the participant operates the operating computer terminal 20 to request the client request processing program 44 to create a list of processes capable of being created by the participant and display the list on the operating computer terminal 20. Upon receipt of the request from the participant, the client request processing program 44 passes the request to the workflow definition managing program 41, and the workflow definition managing program 41 uses the workflow definition 31 to create the list of processes capable of being created. The workflow definition 31 contains a consolidation flag for determining a processing method for the time of one participant's continuous activities, access permission to each field at each node used to determine consolidation processing, work items selectable for each node, and so on.

The workflow process executing program 42 executes a workflow process based on the table information stored in the workflow definition 31. That is, the workflow process executing program 42 makes a decision on the range of information to be consolidated and performs consolidation processing on the information. The workflow instance managing program 43 holds the status of instances actually flowing, for example data inputted by users in the flow of activities, stores the data inputted by the users in the workflow instance data 32, and manages the process history 33 based on these pieces of information. The term "workflow instance" indicates a slip or the like actually moving in the workflow, and is defined in the workflow as a flow of entities.

The client request processing program 44 has a function for accepting or honoring requests from participants using the operating computer terminals 20, for example, various kinds of requests from clients such as a processing request or a request to "open a slit waiting to be processed." The client request processing program 44 provides a participant with a list of activities currently assigned to the participant. The client request processing program 44 also has a function for accepting an activity terminate request from the participant. Any person in charge (participant) can use information stored in the workflow instance data 32 to reference the current state of the process in which the person in charge (participant) has participated. The requests from the clients are passed to the workflow process executing program 42 and the workflow instance managing program 43. The user management program 45 defines persons in charge (users) capable of participating in the workflow system, and defines information relating to the users such as the information describing that B is a superior of A, for example. The user management program 45 registers various kinds of information on the participants in the user information 35 and accesses the user information 35 as needed.

FIGS. 3A and 3B, and FIGS. 4A, 4B, and 4C are tables for explaining information stored in the various tables. FIG. 3A shows table information stored in the workflow definition 31. The workflow definition 31 defines the following attributes: "Workflow Definition ID" as an identifier, "Title" as the name given to a workflow, and "Consolidation Flag" indicating a processing method for the time of one participant's continuous activities. The "Consolidation Flag" is set to "0" when each node is processed individually, and "1" when node information is consolidated and sent to the participant concerned so that the participant can process the nodes at a time. The workflow definition 31 also contains the following entries: "Field Definition" as the definition of each field; "Process Definition" as the definition of the direction of a workflow and operations performed by the workflow engine 40 for the workflow upon selection of a process name or process itself; "Node Definition" as defining the specification of a node name and a participant, access permission to each field at the node, a list of selectable work items, a form layout unique to the node, and the like; "Path Definition" as node connection information; "Standard Layout" as the definition of a standard form layout; "Layout upon One-Participant's Continuous Activities" as the definition of a form layout for the time of one participant's continuous activities.

FIG. 3B shows table information stored in the workflow instance data 32. The workflow instance data 32 contains the following entries: "Record ID" as the identifier of each workflow instance, "Workflow Definition ID" as the identifier of each definition stored in the workflow definition 31, "Slip Number," "Form Originator ID" as a participant operating an operating computer terminal 20, "Preceding Participant ID" as an ID of the immediately preceding participant, "Current Participant ID" as an ID of the current participant, "Node ID" as an ID of the current node, and "Slip Data" as data on respective fields.

FIG. 4A shows various kinds of table information stored in the process history 33. Like in FIG. 3B, the process history 33 contains the following entries: "Workflow Definition ID," "Slip Number," "Current Participant ID," and "Node ID." The process history 33 also contains "Process History" for recording on a node basis a combination of a participant ID, a participant name, selected work, a node where the work has been performed, the date and time of the work, a processing result (error/normal).

FIG. 4B shows a working data table stored in the one-participant's continuous working data 34. It contains the following entries: "Route Information" indicating the range of consecutive nodes to be processed by one participant, "Field Access Permission," "Work Item Table" as a list of work items selectable for each node contained in the route information, "Slip Data" as data on respective fields inputted by the user, and "Work" as work selected by the user, in addition to "Record ID," "Workflow Definition ID," "Slip Number," Current Participant ID," and "Node ID."

FIG. 4C shows a user information table stored in the user information 35. The user information 35 contains the following entries as table information: "Participant ID" as the identifier of a participant, "Name" as the name of the participant, "Superior" as the ID of a superior of the participant." The mark "*1" appended to some entry names in FIGS. 3A and 3B, and FIGS. 4A and 4B indicates data composed of multiple pieces of data and stored in the XML format.

Figure 5:
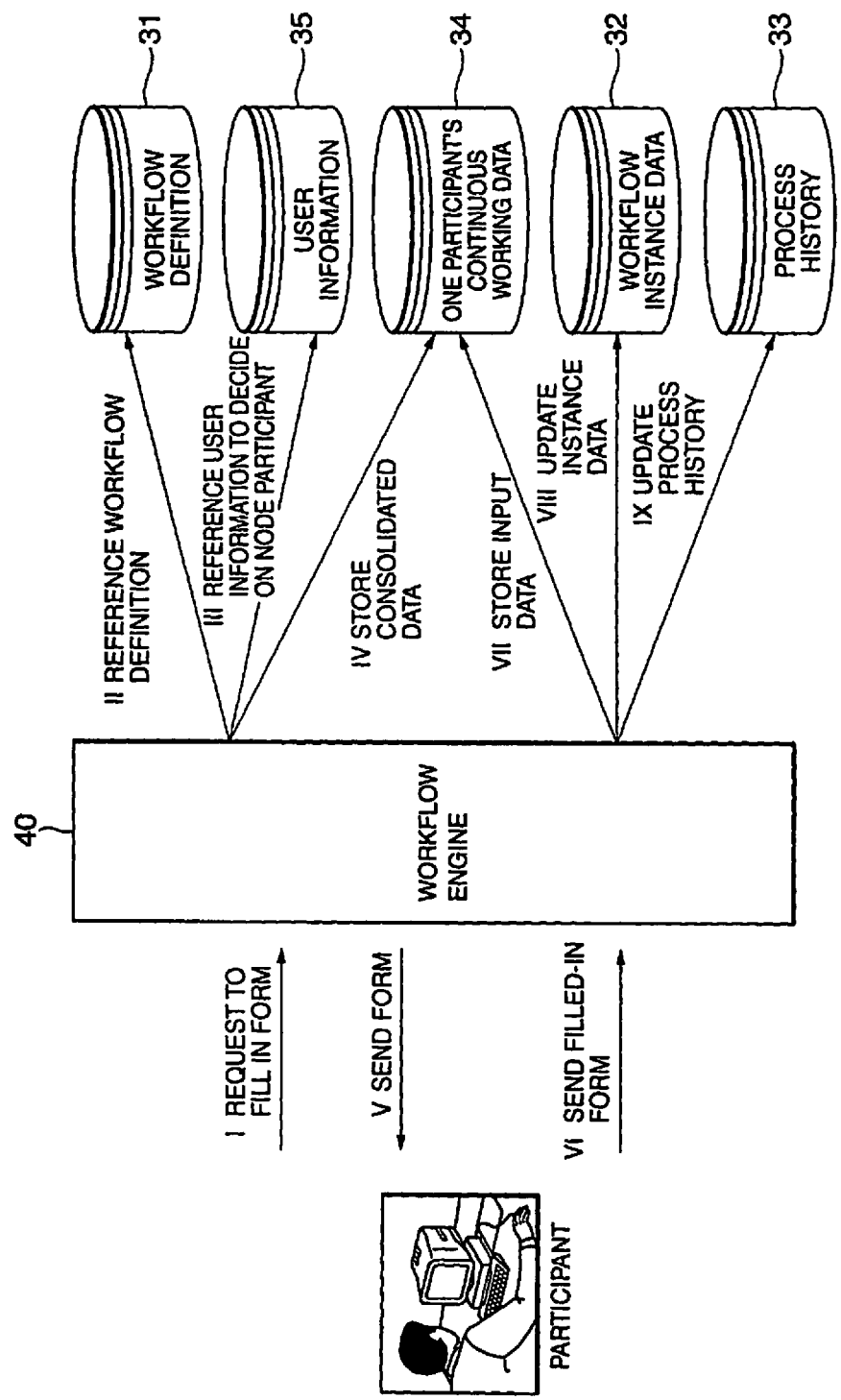
FIG. 5 is a diagram for explaining a flow upon filling in a form.
Figure 6:
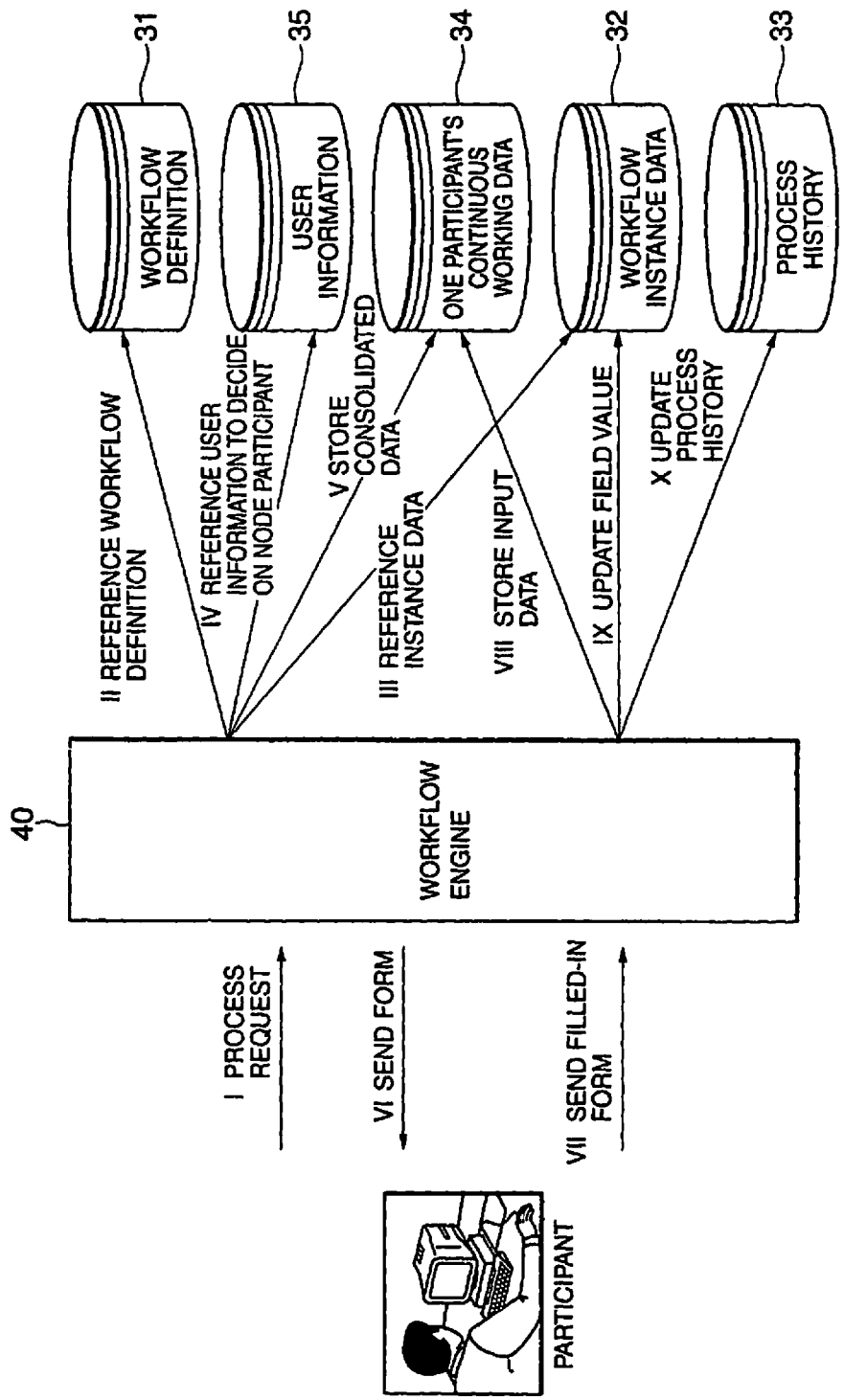

Referring next to FIGS. 5 and 6, a flow upon filling in a form and a flow of work other than fill-in form will be roughly described.

FIG. 5 is a diagram for explaining the flow upon filling in a form. At first, the workflow engine 40 receiving a request to originate a form from a form originator (I in FIG. 5) as a participant operating an operating computer terminal 20 references the workflow definition 31 (II) and references the user information from the user information table 35 (III) to determine a participant for required nodes. Further, the workflow engine 40 stores consolidated data in the one-participant's continuous working data 34 (IV) and sends a form to the participant operating the operating computer terminal 20 (V). After that, when receiving the filled-in form sent from the participant, the workflow engine 40 stores the input data in the one-participant's continuous working data 34 (VII) and updates the instance data in the workflow instance data 32 (VIII). Finally, the workflow engine 40 updates the process history in the process history 33.

FIG. 6 is a diagram for explaining a flow of work other than fill-in form. At first, the workflow engine 40 receiving a process request (I in FIG. 6) from a participant operating an operating computer terminal 20, for example from a person in charge of approval or the like, references the workflow definition 31 (II), the instance data from the workflow instance data 32 (III), and the user information from the user information 35 (IV) to determine a participant for required nodes. Further, the workflow engine 40 stores consolidated data in the one-participant's continuous working data 34 (V), and sends a form to the operating computer terminal 20 of the participant (VI). After that, when receiving the filled-in form sent from the participant (VII), the workflow engine 40 stores the input data in the one-participant's continuous working data 34 (VIII), and updates field values (data) as slit data in the workflow instance data 32 (IX). Finally, the workflow engine 40 updates the process history in the process history 33 (X).

Next, a description will be made of a method of processing multiple consecutive nodes to be processed by one participant by one operation. When nodes to be processed by one participant are in consecutive order, the workflow engine 40 of the embodiment determines the sum of a set of fields to which reference or changes are allowed at respective nodes and a set of possible work items at the time of sending a form to the first node. The workflow engine 40 then sends them all together to an operating computer terminal 20 of the participant. As will be described later, the highest level of access permission selected from among all levels of access permission (Reference allowed/No reference allowed, Changes allowed/No changes allowed, Input necessary) is assigned to each field.

Preprocessing by the workflow engine will first be described. In the preprocessing, the consecutive nodes are defined by the workflow definition managing program 41, and the results of the preprocessing are stored in the workflow definition 31.

Figure 7A:
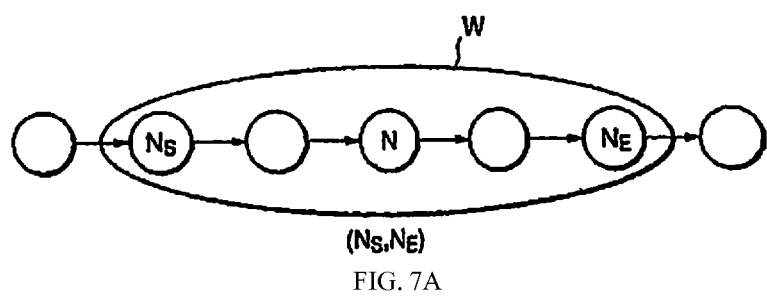

FIGS. 7A to 7D illustrate the definition of relative ranks of nodes and the direction of movement of the nodes. As shown in FIG. 7A, if node $N_S$ to node $N_E$ (where $N_S$ and $N_E$ are different nodes) are in consecutive order in workflow W, where the forward direction of a route is the direction from $N_S$ to $N_E$, the route is represented by ($N_S$, $N_E$). Further, if any one node in the route ($N_S$, $N_E$) is N, the relative ranks of the nodes are defined as follows:

$$N_S < N_E,$$

$$N_S < N < N_E$$

(when N does not correspond to both $N_S$ and $N_E$), $$N_S = N$$

(when N and $N_S$ are the same node), and $$N_E = N$$

(when N and $N_E$ are the same node).

Figure 7B:
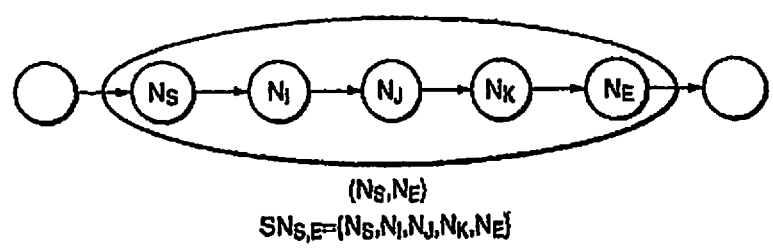

As shown in FIG. 7B, if a set of all the nodes included in the route ($N_S$, $N_E$) is $SN_{S,E}$, the set $SN_{S,E}$ is represented by:

$$SN_{S,E} = [N_S, N_I, N_J, N_K, N_E]$$

Figure 7C:

Then, as shown in FIGS. 7C and 7D, if work E is performed at node N, a function Dir is defined to return "1" when the direction of movement of the flow resulting from the work E matches the forward direction of the route, that is, when the workflow advances from node N to node M (N<M), or "−1" when the workflow advances in the reverse direction (from node N to node M (N>M)). In FIG. 7C, since the flow direction of the workflow definition and the direction of movement of the flow resulting from the work E are both the forward direction, the function Dir is:

$$Dir(E) = 1.$$

On the other hand, in FIG. 7D, since the flow direction of the workflow definition is opposite to the direction of movement of the flow resulting from the work E, the function Dir is:

$$Dir(E) = -1.$$

In the case where the work E is decided to be performed at a node by participant U, if the participant U selects alternative work F instead of the work E for another node $N_M$ because the work E is not selectable for the node $N_M$, it is represented as:

$$Alt(E, N_M) = F.$$

For example, there is a case where the participant performs work as "fill-in form" on a node and then selects the work of "approval" on another node at all times. On the other hand, if any one work cannot be uniquely decided to be an alternative to that on the node $N_M$ instead of the work E so that the participant will have to make a re-determination of which alternative work to select, it is represented as:

$$Alt(E, N_M) = 0.$$

The function Alt is thus defined. Further, if the work E is selectable for the node $N_M$, it is represented as:

$$Alt(E, N_M) = E,$$

where $Dir(E) = Dir(F) \neq 0$. The function Alt is defined as an attribute of each workflow, and stored in the workflow definition.

Suppose here that the participant U processes all the nodes belonging in the route ($N_S$, $N_E$), and the route ($N_S$, $N_E$) meets one of conditions (1) to (3) to be described later. In this case, the workflow engine 40 consolidates information necessary for activities in the route ($N_S$, $N_E$) and provides the participant U with the consolidated information at the first node (at $N_S$ if the route meets condition (1) or (2), or at $N_E$ if it meets condition (3)) so that the participant U can complete his or her work at a time.

Figure 8A:
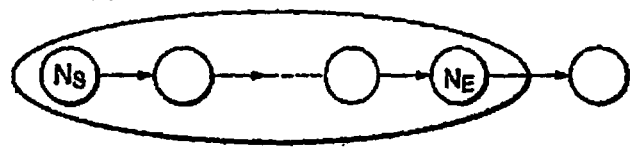
FIGS. 8A, 8B, and 8C contains illustrations for explaining routes ($N_S$, $N_E$) under conditions (1) to (3) respectively.
Figure 8B:
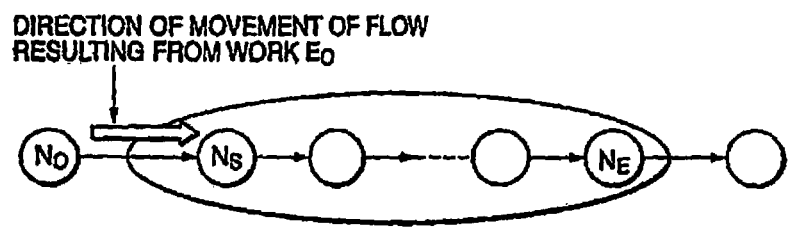
Figure 8C:
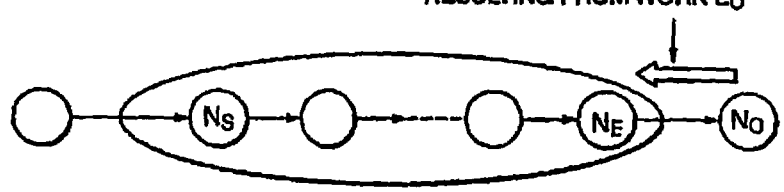

FIGS. 8A to 8C illustrate variations of the route ($N_S$, $N_E$) that meet the conditions (1) to (3) respectively. As shown in FIG. 8A, the condition (1) assumes that the workflow W starts from the node $N_S$ at which the participant U performs work $E_S$ ($Dir(E_S)=1$), and alternatives to the work $E_S$ exist at all the nodes N in the route ($N_S$, $N_E$), that is, work items that meet $Alt(E_S, N)=E.noteq.0$ exist.

Next, as shown in FIG. 8B, the condition 2 assumes that the flow advances from node No outside the route ($N_S$, $N_E$) and enters the route ($N_S$, $N_E$) from the node $N_S$ at which the participant U performs the work $E_S$ ($Dir(E_S)=1$), and alternatives to the work $E_S$ exist at all the nodes N in the route ($N_S$, $N_E$), that is, work items that meet $Alt(E_S, N)=E.noteq.0$ exist.

Next, as shown in FIG. 8C, the condition 3 assumes that the flow advances from node No outside the route ($N_S$, $N_E$) and enters the route ($N_S$, $N_E$) from the node $N_E$ at which the participant U performs work $E_E$($Dir(E_E)=-1$), and alternatives to the work $E_E$ exist at all the nodes N in the route ($N_S$, $N_E$).

FIGS. 9A to 9C are to give supplemental information about the above-mentioned conditions (1) to (3).

FIGS. 9A and 9B assume a case where there are multiple work items selectable for the first node, and routes exist in which two or more of the work items meet either of the conditions (1) to (3), explaining methods of determining the range of information to be provided to the participant U.

If one route contains all other routes determined for respective work items, the range of the route containing the others is provided to the participant U. In the example of FIG. 9A, since route 1 is contained in route 2, the range of the route 2 is provided to the participant U. On the other hand, if there is no inclusion relationship between routes determined for respective work items, the range of common part of all the routes is provided to the participant U. For example, there is a case where route 1 is to "make an approval decision with keeping a log" and route 2 is to "make an approval decision without keeping a log." In the example of FIG. 9B, since the route 1 and the route 2 are conditional branches, the range of common part of the conditional branches is provided to the participant U.

If it is difficult to substantiate at the first node in a conditional route whether the following nodes meet the condition or not, the route of nodes before the first node of the conditional route is regarded as a target route.

On the other hand, if it is substantiated at the first node of a conditional route or unconditional branch that the following nodes meet the condition without any change in the condition in the route, the following nodes are included in the target route as long as they meet the condition. For example, it is assumed in FIG. 9C that nodes $N_0$, $N_1$, $N_2$, $N_3$, and $N_4$ are processed by one participant U. It is also assumed that the flow of a route from $N_0$ to $N_1$ and the flow of a route from $N_0$ to $N_3$ are both necessarily generated just like a carbon copy, that is, both routes are regarded as unconditional routes. In this case, the workflow engine 40 consolidates and provides information relating to the nodes $N_0$, $N_1$, $N_2$, $N_3$, and $N_4$.

A description will next be made of information to be consolidated. The workflow engine 40 defines information to be provided to one participant U to consolidate the information based on information on a slip definition prior to sending it to the participant U.

For the definition about fields, it is assumed that information used for determination on a form by one participant U is held in the fields defined on the form. The term "fields" denote segments on the database, each of which holds user input so that the contents of the input will be displayed on a screen. Taking a form flowing in a workflow as an example, the fields correspond to square cells or entry boxes to be filled in with information such as name, personnel information, personnel evaluation, and the like. For example, for personnel records, information on a form originator may include as field values the name of the form originator, personnel evaluation of the form originator, and the like. In this case, for example, the form originator may not want to display the contents filled in certain field $F_2$ at the node of section chief, or may see no harm in displaying his or her name but not want anybody to change the name at each node, or may not want to show personal information on his or her personnel evaluation depending on the posts. In response to such cases, various kinds of information are segmented by field in the embodiment so that access permission can be defined for each field at a node.

It is assumed here that fields defined on a form are $F_1$, $F_2$, ..., $F_n$, and access permission of the participant U to field F at node $N_x$ is $AR(F, N_x)$. Further, access permission to field $F_m$ ($m=1, ..., n$) as consolidated information to be provided to the participant U takes the maximum value of AR ($F_m$, N) for node N that meets $N_S<N<N_E$. In other words, the highest level of access permission to each field selected for each node is set as the field access permission to be provided to the participant U. Even though access permission to information is set in this manner, since the set access permission originates from the access permission assigned to the node to be processed by the same participant, there is no problem with security at all.

For example, the access permission is defined as follows:
1. No reference allowed: The field value cannot be referenced to at the node.
2. Reference allowed: The field value can be referenced to at the node, but cannot be changed.
3. Changes allowed: The field value can be referenced to at the node. In addition, input of a new value and changes in the value are allowed.
4. Input necessary: This level of access permission is comparable to the level of reference allowed. In addition, entering a value in the field is essential to send the form from the node to another.

In this case, the levels of permission are as follows:
Reference not allowed<Reference allowed<Changes allowed<Input necessary.

For example, when access permission to a certain field at a node is defined as "1. No reference allowed," the field value is not displayed on the operating computer terminal 20 corresponding to the node. When access permission to a certain field at a node is defined as "2. Reference allowed," the field value is displayed on the operating computer terminal 20 corresponding to the node, but any change in the value is prohibited. For personnel records, for example, a field to be filled in with the name of a form originator may be defined at this level. The kinds and levels of access permission are defined in the manner mentioned above. As a result, access permission to information can be defined as followed. Namely, information at the level of "no reference allowed" at all consecutive nodes is set to the level of "no reference allowed," information to which the highest level of access permission is "reference allowed" is set to the level of "reference allowed," information to which the highest level of access permission is the level of "input allowed" is set to the level of "input allowed," and information to which the highest level of access permission is "input necessary" is set to the level of "input necessary."

Figures 10A, 10B:
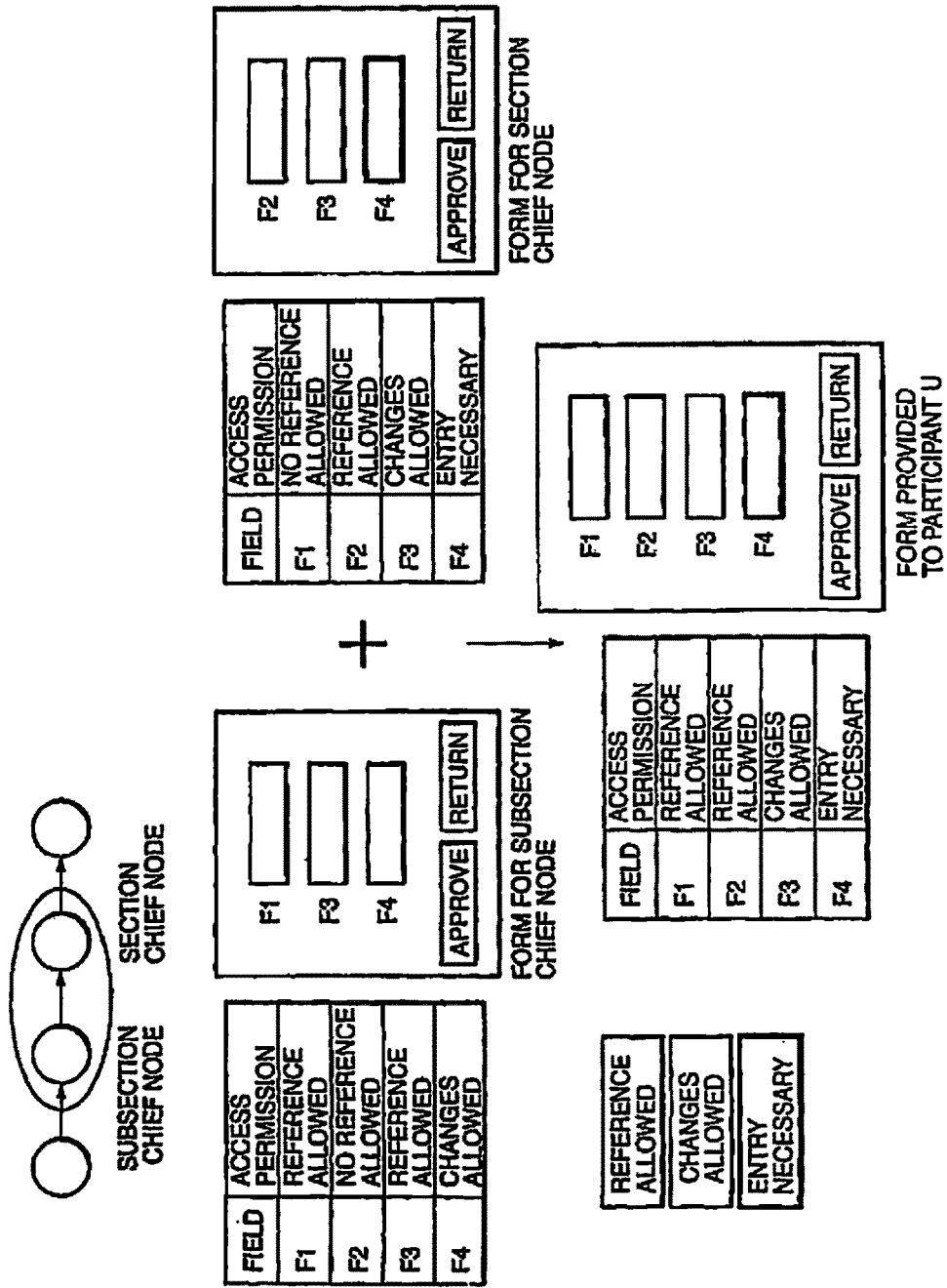
FIGS. 10A and 10B contains illustrations for explaining field access permission.

FIGS. 10A and 10B illustrate access permission to respective fields. For example, it is assumed that the subsection-chief node and the section-chief node are processed by one participant U as shown in FIG. 10A, and access permission to each field at each node are defined as shown in FIG. 10B. These definitions are stored in the workflow definition 31. It is apparent from FIG. 10B that access permission to field F1 assigned to the participant U is the level of "reference allowed" for the subsection-chief node. Access permission to field F2 assigned to the participant U is the level of "reference allowed" for the section-chief node. Field F3 is part of a form to be processed at both the subsection-chief node and the section-chief node, but the level of access permission of the subsection-chief node is "reference allowed" and the level of access permission of the section-chief node is "changes allowed." Therefore, the access permission to the field F3 to be provided to the participant U as consolidated information is the level of "changes allowed" higher than the other. Further, the level of access permission to field F4 to be provided to the participant U as consolidated information is the level of "input necessary" higher than the other.

In processing for consolidating information, a set of all node names in the route ($N_S$, $N_E$) and a set of work items applicable at the nodes are generated as a table. The table information is provided to the participant U. The participant U chooses one of the work items based on the information through a user interface to be described later. FIG. 11 shows an example of the work table for the nodes to be processed by the same participant U. As shown, the work table is used when the participant U processes node A having "fill-in form" and "return" as possible work items, and node B having "approve" and "return" as possible work items.

Figure 12A:
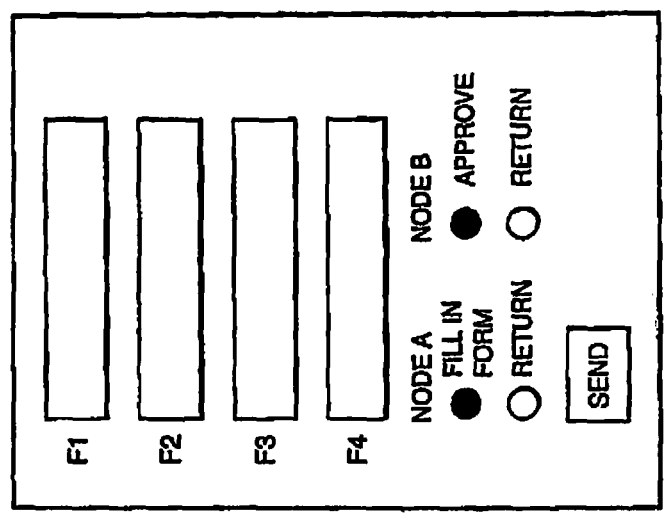
FIGS. 12A and 12B contains illustrations showing examples of user interfaces.
Figure 12B:
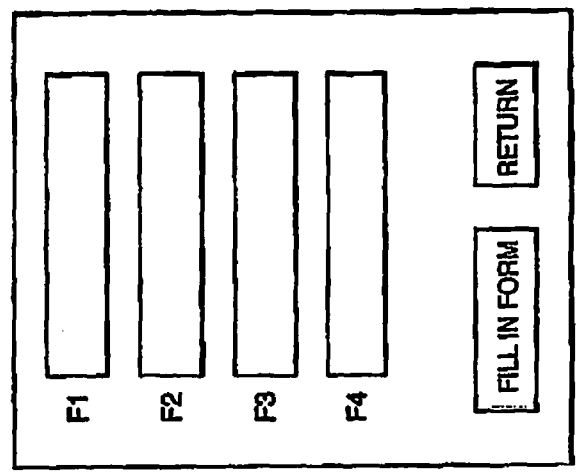

Work items performed by the same participant U will next be described. The participant U references or inputs information based on the sent information, and ultimately selects either of work items. Two user interfaces as shown in FIGS. 12A and 12B are provided for the selection. The choice of which user interface to use can be made by specifying it at the time of form definition or by the user upon execution.

FIG. 12A shows an example of a user interface for the "selection of a work item for each node." On the user interface, the user as the same participant U selects a work item for each node based on the work table sent from the workflow engine 40, and after completion of the selection for all the nodes, sends them to the workflow engine 40. In the example of FIG. 12A, either "fill in form" or "return" is selected for the node A and either "approve" or "return" is selected for the node B at the push of a radio button. FIG. 12B shows an example of another user interface for the "selection of only one work item." In this case, selectable work items are displayed at the first node in the route, so that the user as the same participant U selects one work item from the displayed work items, and sends it to the workflow engine 40.

Postprocessing by the workflow engine 40 will next be described. After receiving the results of the work selection from the same participant U, the workflow engine 40 makes a "decision on work assignment to each node" and a "change in value of each field." For the "decision on work assignment to each node," if work has been selected by the same participant U on the user interface for the "selection of a work item for each node" as shown in FIG. 12A, the work on each node is decided according to the following rule. It is assumed in this rule that work selected by the same participant U for the first node $N_S$ is $E_S$.

If work E on node M meets Alt($E_S$, M)=E, the work E is assigned to the node M to advance the flow.

If work E on node M does not meet Alt($E_S$, M)=E, the workflow engine 40 evaluates the work, stops the flow at the time of transition of a form to the next node, and sends the form again to the same participant U to urge the participant U to perform work on the node.

On the other hand, if work has been selected on the user interface for the "selection of only one work item," the work on each node is decided according to the following rule. It is assumed in this rule that the same participant U has selected work E.

If the selected work E is selectable for node M, the work will be regarded as having been selected.

If the selected work E is not selectable for node M (that is, if Alt (E, M).noteq.0), an alternative work item Alt (E, M) will be regarded as having been selected. In this case, if no alternative has been defined, the workflow engine 40 stops the flow, and sends the form again to the same participant U to urge the participant U to perform work on the node.

For the "change in value of each field," the highest level of field access permission in the route ($N_S$, $N_E$) is assigned in the same manner as mentioned in the preprocessing by the workflow engine 40. This may cause a contradiction between the change in value of each field and the access permission to the field at the node as the flow advances after making a decision on work for each node according to the rule of the "decision on a work item at each node." For example, when access permission is set as shown in the example of FIG. 10B, it is likely that the participant U has changed the value of the field F3. In such a case, when the workflow engine 40 evaluates work on the subsection-chief node, it runs counter to the access permission of the level of "reference allowed (no change allowed)." Therefore, the workflow engine 40 makes no change in value of the field F3 on the form and advances the flow to the section-chief node. The user inputted value into the field F3 is held and reflected in the field F3 at the section-chief node. This can prevent any change in value contradictory to the access permission to the field at the node.

The above describes the embodiment in detail, and a sequence of operations in the embodiment will next be described with reference to FIGS. 13 to 18.

Figure 13:
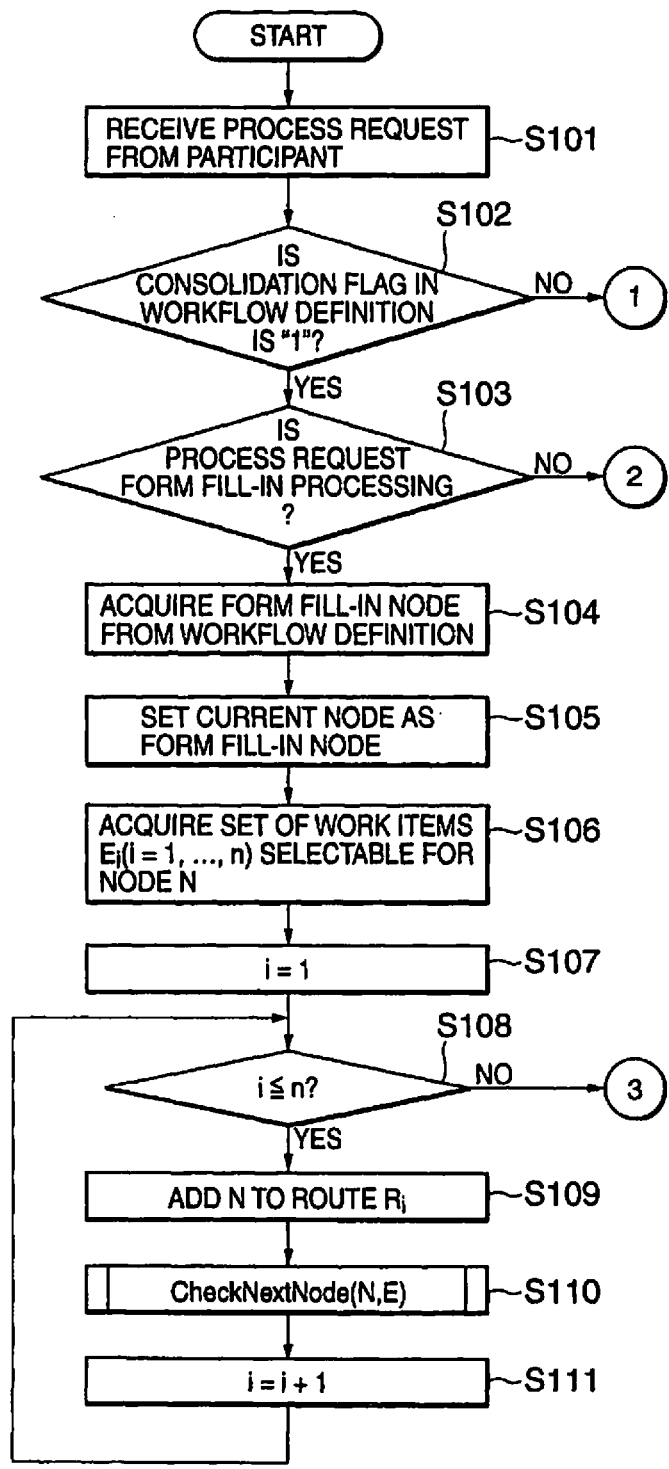
FIG. 13 is a flowchart for explaining a method of determining the range of consolidating information and a method of consolidating information.

FIGS. 13 to 16 are flowcharts for explaining a method of determining the range of consolidating information and a method of consolidating information. As shown in FIG. 13, the workflow engine 40 first receives a process request from a participant operating an operating computer terminal 20 (step 101), and determines whether the value of the consolidation flag in the workflow definition 31 is "1" (step 102). In other words, when the participant corresponds to consecutive nodes, the workflow engine 40 determines whether to process the consecutive nodes at a time or one by one as in the conventional manner. When processing the consecutive nodes at a time, the workflow engine 40 sets "1" for the consolidation flag. In step 102, if the value of the consolidation flag is not "1," program execution goes to processing 1, that is, to step 305 shown in FIG. 15 to process the nodes sequentially one by one even when the participant corresponds to the consecutive nodes. If the value of the consolidation flag is "1," the execution goes to consolidation processing.

In the consolidation processing, it is first determined whether the process request is for fill-in form processing (step 103). If it is not fill-in form processing, program execution goes to processing 2 shown in FIG. 14. If it is the fill-in form processing, a fill-in form node is acquired from the workflow definition 31 (step 104), and current node N is set as the fill-in form node (step 105) to be watched. Then, a set of work items $E_i$ (I=1, . . . , n) selectable for the node N is acquired (step 106). For each element of the set $E_i$, a route $R_i$ as the range of consolidating corresponding information is determined. The initial value of i in the set $E_i$ is first set to "1" (that is, i=1) (step 107) to determine whether $i.ltoreq.n$ (step 108). If it is not $i.ltoreq.n$ (if i exceeds n), program execution goes to processing 3, that is, to step 301 shown in FIG. 15 to perform information consolidation processing. If it is $i.ltoreq.n$, N is added to the route $R_i$ (step 109) to decide on the range of consolidation. Then execution goes to the subroutine of CheckNextNode (N, $E_i$) to check the existence of the next node in the consecutive nodes to be processed by the same participant U (step 110). This subroutine is illustrated in FIG. 16. After completion of the subroutine, "1" is added to i (i=i+1) (step 111), and program execution returns to step 108 to repeat steps 109 to 111 until i exceeds n.

Figure 14:
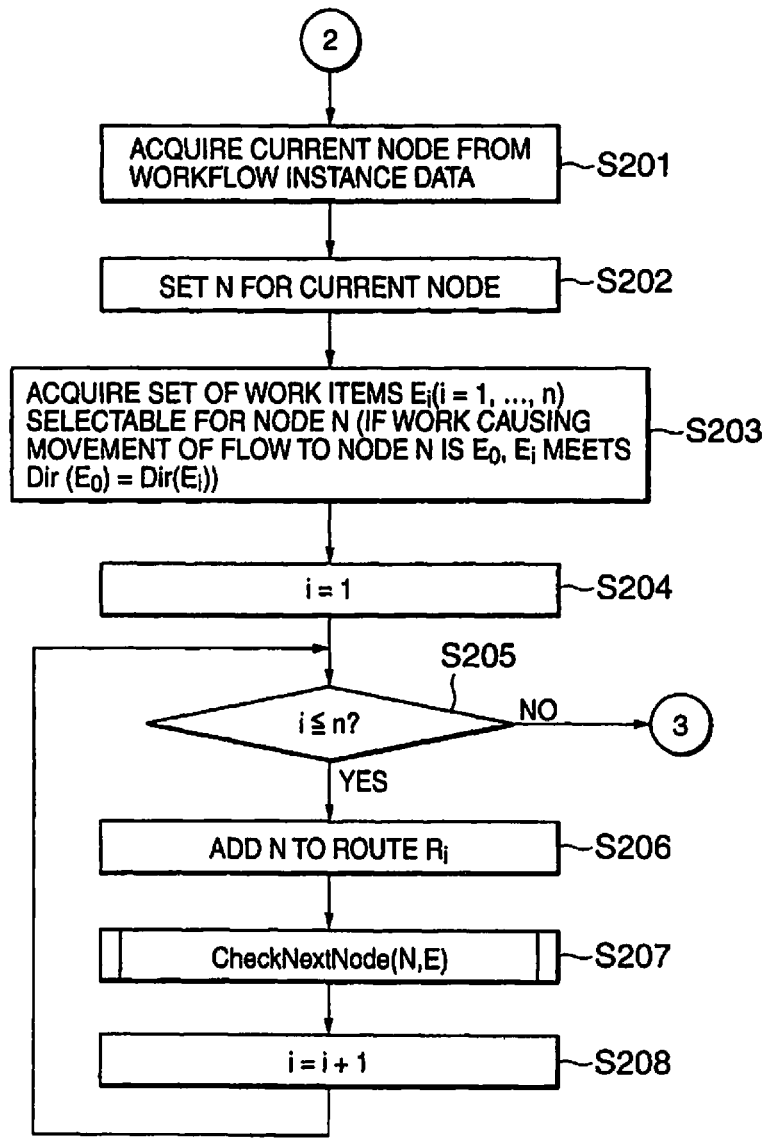
FIG. 14 is a flowchart for determining the range of consolidating information and the method of consolidating information.

FIG. 14 is a flowchart showing processing when it is determined in step 103 that the process request is not for the fill-in form processing. The workflow engine 40 first acquires the current node from the workflow instance data table 32 (step 201). Then the workflow engine 40 sets N for the current node (step 202) and acquires work items $E_i$ (i=1, . . . , n) selectable for the node N (step 203). It is assumed here that if work causing the movement of the flow to the node N is $E_0$, $E_i$ meets $Dir(E_0)=Dir(E_i)$. As described in FIG. 7(*c*), the function Dir is a function defining the direction of a flow. The workflow engine 40 sets i=1 (step 204) in acquiring a set of work items $E_i$ to determine whether $i.ltoreq.n$ (step 205). If it is not $i.ltoreq.n$ (if i exceeds n), program execution goes to processing 3, that is, to step 301 shown in FIG. 15 to perform information consolidation processing. If it is $i.ltoreq.n$, N is added to the route $R_i$ (step 206). Then execution goes to the subroutine of CheckNextNode (N, $E_i$) shown in step 207. This subroutine is illustrated in FIG. 16. After completion of the subroutine, "1" is added to i (i=i+1) (step 208), and program execution returns to step 205 to repeat steps 206 to 208 until i exceeds n.

Figure 15:
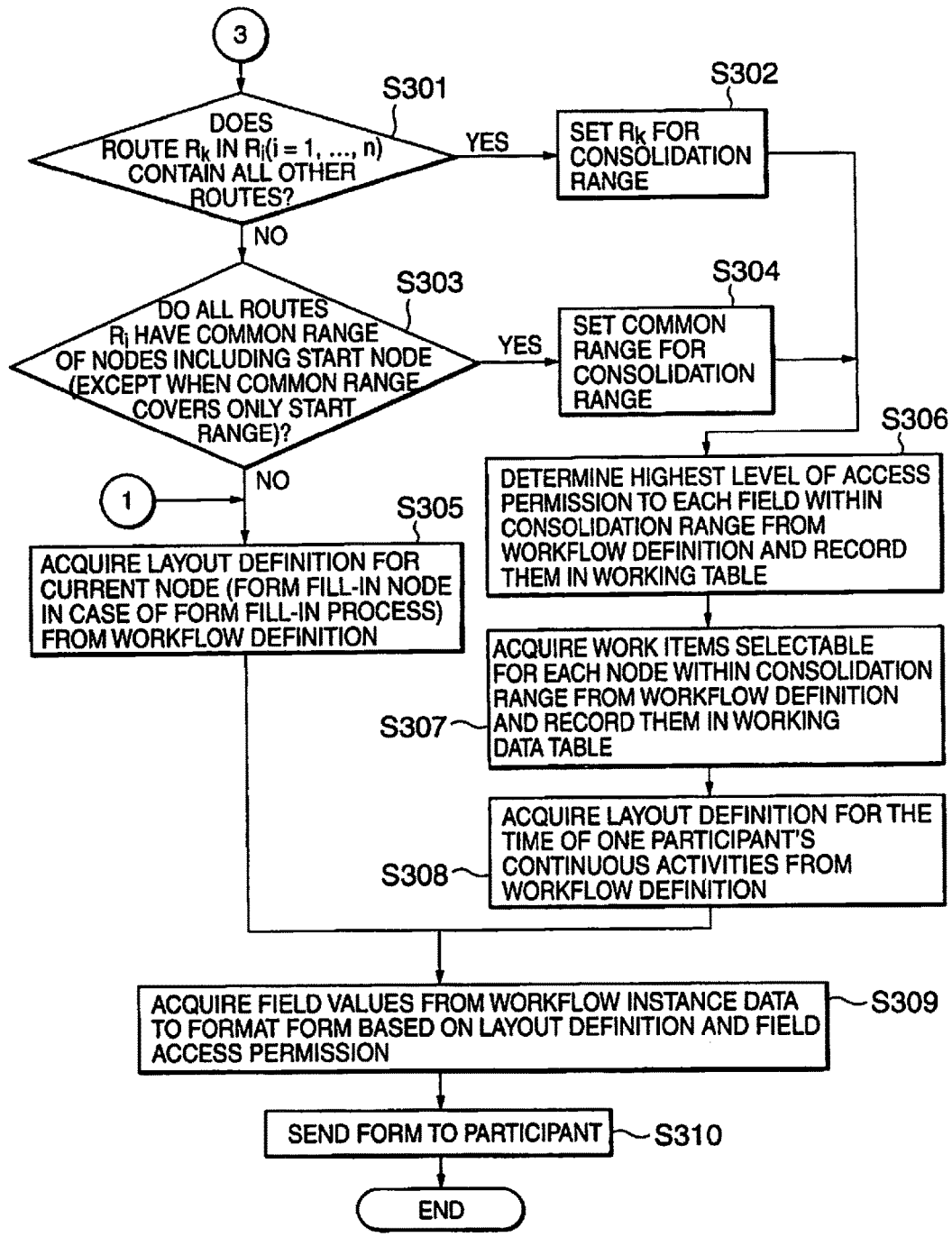
FIG. 15 is a flowchart for explaining the method of determining the range of consolidating information and the method of consolidating information.
Figure 16:
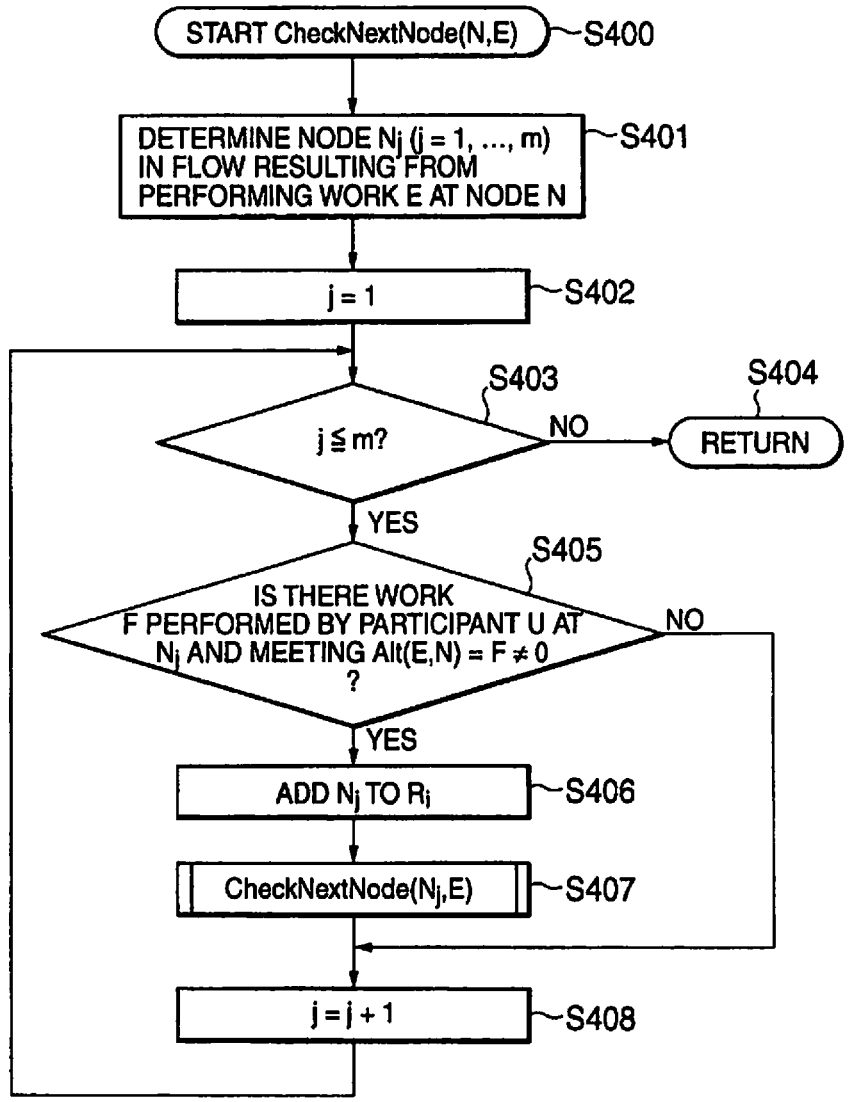
FIG. 16 is a flowchart for explaining the method of determining the range of consolidating information and the method of consolidating information.

FIG. 15 is a flowchart showing processing 3 as information consolidation processing. The information consolidation processing is executed when it is not $i.ltoreq.n$ (when i exceeds n) in step 108 of FIG. 13 or in step 205 of FIG. 14. It is first determined whether a route $R_k$ in the set of routes $R_i$ (i=1, . . . , n) contains all other routes (step 301). Specifically, as shown in FIG. 9(*a*), there is a case where the route 2 contains the route 1. If the route $R_k$ contains all other routes, the route $R_k$ is set as the consolidation range (step 302), and program execution goes to step 306. If it does not contain all other routes, it is determined whether all the routes $R_i$ have a common range of nodes including the start node (except when the common range covers only the start node) (step 303). Specifically, as shown in FIG. 9(*b*), it is determined whether there is a common range in case of occurrence of conditional branches to the route 1 and the route 2. If there is a common range, the common range is set as the consolidation range (step 304) and program execution goes to step 306. If it is determined in step 303 that there is no common range, all the routes are regarded as having no common nodes except for the start node, and the nodes are processed one by one. In other words, a layout definition for the current node (fill-in form node in case of fill-in form processing) is acquired from the workflow definition 31 (step 305), and field values are acquired from the workflow instance data table 32 to format a form based on the layout definition and field access permission (step 309). After that, the form is sent to the participant U (step 310) to end the processing. Since operations starting from step 305 are normal operations for processing nodes one by one, they are executed unless consolidation processing is performed, that is, even when it is determined in step 102 of FIG. 13 that the consolidation flag in the workflow definition is not "1" (when program execution goes to processing 1).

After passing steps 302 and 304, the workflow engine 40 acquires in the flow of the consolidation processing the highest level of access permission to each field within the consolidation range from the workflow definition 31 to record it in the one-participant's continuous working data table 34 (step 306). Further, the workflow engine 40 acquires work items selectable for each node within the consolidation range from the workflow definition 31 to record it in the one-participant's continuous working data table 34 (step 307), and acquires the layout definition of a form used for the time of one participant's continuous activities from the workflow definition 31 (step 308). The workflow engine 40 then acquires field values from the workflow instance data table 32 in the manner mentioned above to format the form based on the form layout definition and field access permission (step 309). After that, the form is sent to the participant operating the operating computer terminal 20 (step 301) to end the processing.

FIG. 16 is a flowchart showing the processing of CheckNextNode (N, E) shown in step 207 of FIG. 14. Following the initiation of the CheckNextNode (N, E) processing (step 400), a node $N_j$ (j=1, . . . , m) in a flow resulting from performing work E at node N is determined (step 401). In this case, j=1 is first introduced (step 402), and predetermined operations are executed until j exceeds m. In other words, it is determined whether $j.ltoreq.m$ (step 403), and if not $j.ltoreq.m$, program execution returns to the preceding processing to exit from the subroutine (step 404). If $j.ltoreq.m$, it is then determined whether there is work F performed by the same participant U at node $N_j$ and meeting $Alt(E, N_j)=F.noteq.0$ (step 405). If there is no such work F, program execution goes to step 408. If there is such work F, $N_j$ is added to the route $R_i$, and the processing of CheckNextNode ($N_j$, E) as the subroutine starting from step 400 is executed to recursively check the existence of the next node to be continuously processed by the same participant U (step 407). After completion of the subroutine, 1 is added to j (j=j+1) (step 408) and program execution returns to step 403. In the processing shown in FIG. 16, the existence of the next node is checked until the same participant's activities disappear.

As discussed above, the method of determining the range of consolidating information and the method of consolidating information can be translated into a method of determining, for each element of a set of selectable work items $E_i$ (i=1, . . . , n), such a route $R_i$ as to meet one of the conditions (1) to (3) described in FIG. 8(*a*) to 8(*c*).

Figure 19:
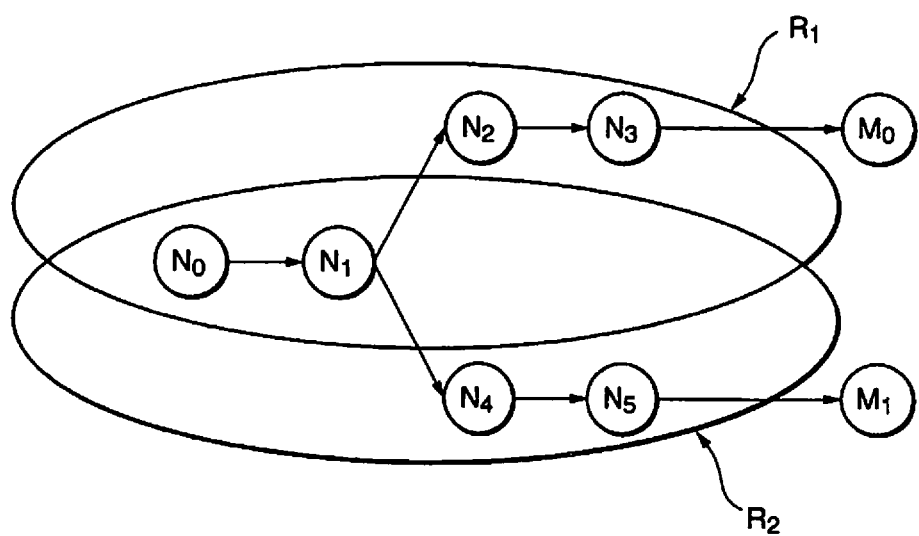
FIG. 19 is a diagram showing an example of determining the range of consolidating information and the method of consolidating information.

For example, consider a workflow defined as shown in FIG. 19. It is assumed here that $N_0$ to $N_5$ are processed by one participant, and participants processing $M_0$ and $M_1$ are different from the participant processing $N_0$ to $N_5$. In this case, the workflow is performed as follows:

If work items selectable for $N_0$ are $E_1$ and $E_2$, the flow goes to $N_1$ in either way of two choices, $E_1$ or $E_2$.

If work items selectable for $N_1$ are $F_1$ and $F_2$, the flow goes to both $N_2$ and $N_4$ in either way of two choices, $F_1$ or $F_2$. Further, Alt ($E_1$, $N_1$)=$F_1$ and Alt ($E_2$, $N_1$)=$F_2$ are set, that is, $F_1$ is set as an alternative to $E_1$ at $N_1$ and $F_2$ is set as an alternative to $E_2$ at $N_1$.

If work selectable for $N_2$ is $F_1$, the flow goes to $N_3$ by selecting $F_1$. Further, Alt ($E_1$, $N_2$)=$F_1$ is set, that is, $F_1$ is set as an alternative to $E_1$ at $N_2$, and Alt ($E_2$, $N_2$)=0 is set, that is, it is set that there is no alternative to $E_2$ at $N_2$.

If work selectable for $N_3$ is $F_1$, the flow goes to $M_0$ by selecting $F_1$. Further, Alt ($E_1$, $N_3$)=$F_1$ is set, that is, $F_1$ is set as an alternative to $E_1$ at $N_3$, and Alt ($E_2$, $N_3$)=0 is set, that is, it is set that there is no alternative to $E_2$ at $N_3$.

If work selectable for $N_4$ is $F_2$, the flow goes to $N_5$ by selecting $F_2$. Further, Alt ($E_2$, $N_4$)=$F_2$ is set, that is, $F_2$ is set as an alternative to $E_2$ at $N_4$, and Alt ($E_1$, $N_4$)=0 is set, that is, it is set that there is no alternative to $E_1$ at $N_4$.

If work selectable for $N_5$ is $F_2$, the flow goes to $M_1$ by selecting $F_2$. Further, alt ($E_2$, $N_5$)=$F_2$ is set, that is, $F_2$ is set as an alternative to $E_2$ at $N_5$, and Alt ($E_1$, $N_5$)=0 is set, that is, it is set that there is no alternative to $E_1$ at $N_5$.

In the above flow, if the participant selects $E_1$ for $N_0$, the route $R_1$ contains {$N_0$, $N_1$, $N_2$, and $N_3$}. On the other hand, if the participant selects $E_2$ for $N_0$, the route $R_2$ contains {$N_0$, $N_1$, $N_4$, and $N_5$}.

Figure 17:
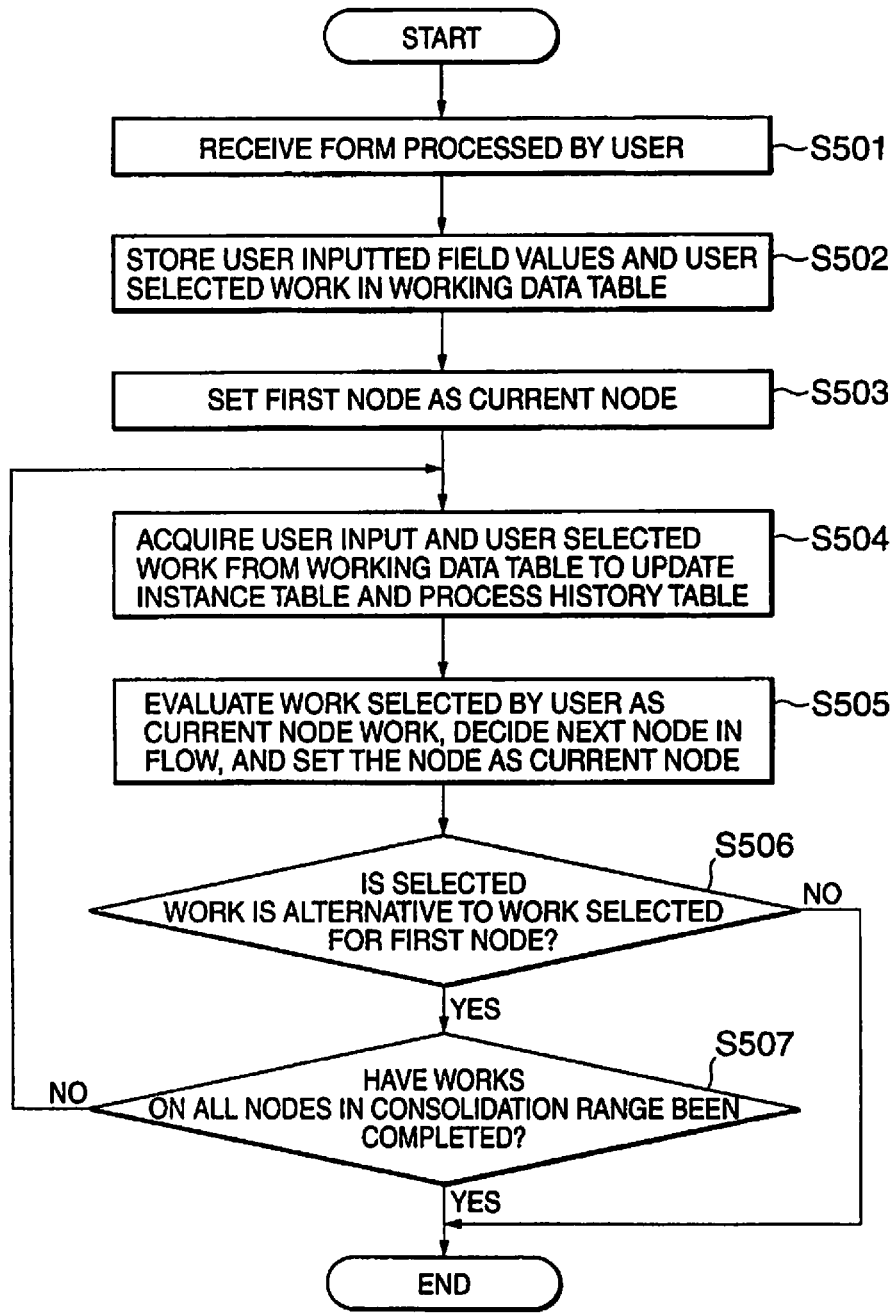
FIG. 17 is a flowchart showing postprocessing by a workflow engine.

FIG. 17 is a flowchart showing postprocessing by the workflow engine 40 when a work item is selected for each node. At first, the workflow engine 40 receives a filled-in form processed by a user on an operating computer terminal 20 (step 501). The workflow engine 40 then stores user-inputted field values and user-selected work from the operating computer 20 in the one-participant's continuous working data table 34 (step 502). At this time, the first node is set as the current node (step 503). The workflow engine 40 acquires user input and user-selected work from the one-participant's continuous working data table 34 to update the workflow instance data table 32 and the process history table 33 (step 504).

Next, the workflow engine 40 evaluates the work selected for the current node by the user of the operating computer terminal 20 to decide the next node in the flow and set the decided node as the current node (step 505). The workflow engine then determines whether the selected work is an alternative to the work selected for the first node (step 506). If it is not an alternative, the processing is ended. If it is an alternative, the workflow engine 40 determines whether works on all nodes in the consolidation range have been completed (step 507), and if the works on all the nodes have not been completed yet, the program execution returns to step 504 to complete all the works and end the postprocessing.

Figure 18:
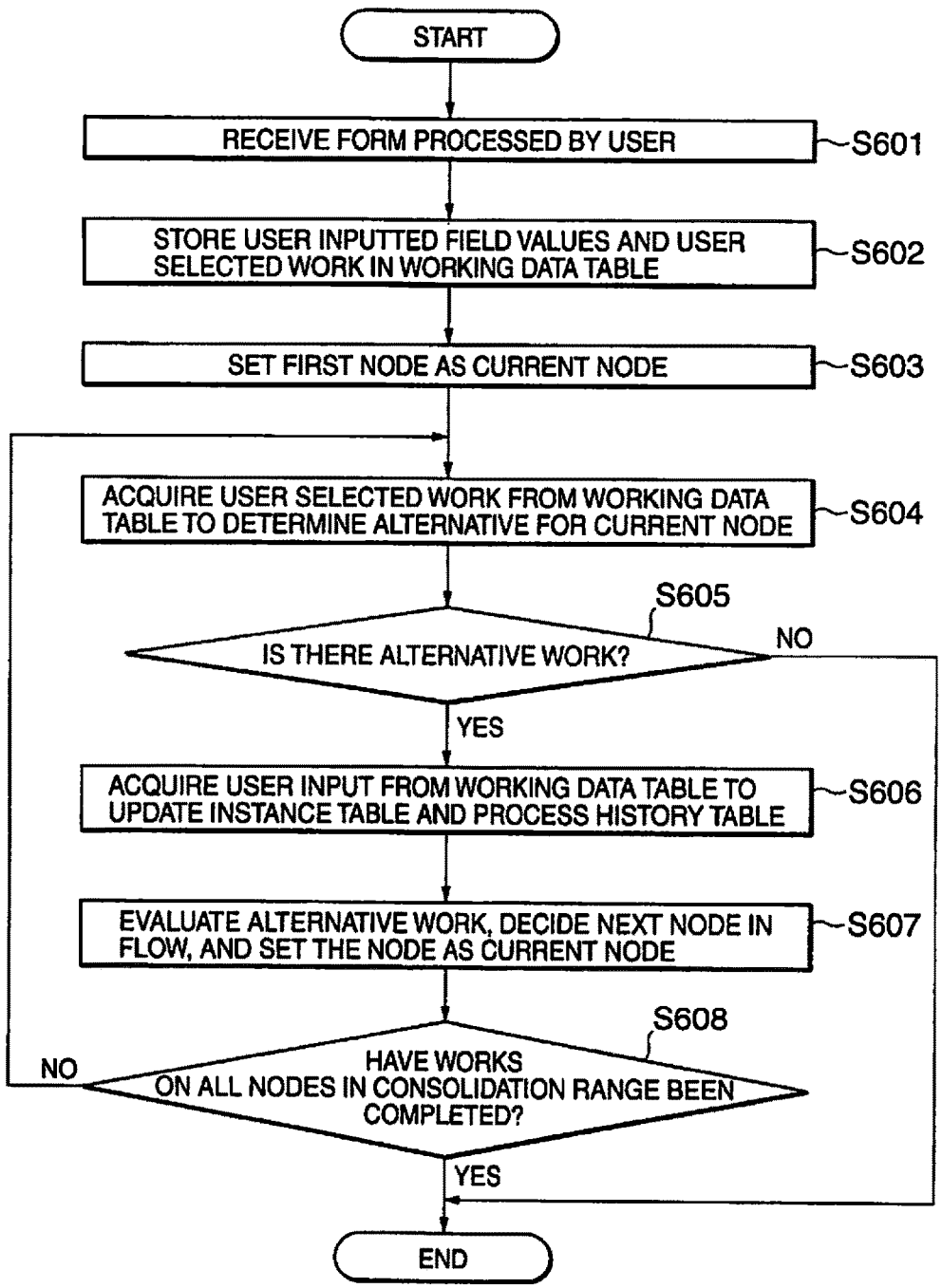
FIG. 18 is a flowchart showing postprocessing by the workflow engine.

FIG. 18 is a flowchart showing postprocessing by the workflow engine 40 when only one work item is selected for consecutive nodes. At first, the workflow engine 40 receives a filled-in form processed by a user on an operating computer terminal 20 (step 601). The workflow engine 40 then stores user-inputted field values and user-selected work from the operating computer 20 in the one-participant's continuous working data table 34 (step 602). At this time, the first node is set as the current node (step 603). The workflow engine 40 acquires user input and user-selected work from the one-participant's continuous working data table 34 to determine an alternative work for the current node (step 604).

The workflow engine 40 determines whether there is an alternative work (step 605). If there is no alternative work, the postprocessing is ended. If it is an alternative work, the workflow engine 40 acquires user input from the one-participant's continuous working data table 34 to update the workflow instance data table 32 and the process history table 33 (step 606). After that, the workflow engine 40 evaluates the alternative work to decide the next node in the flow and set the decided node as the current node (step 607). The workflow engine 40 determines whether the work on all nodes in the consolidation range have been completed (step 608), and if the work on all the nodes have not been completed yet, the program execution returns to step 604 to complete the work on all the nodes and end the postprocessing.

As described above, according to the embodiment, when nodes to be processed by one participant U are in consecutive order and a form reaches the first node, the workflow engine 40 consolidates information necessary for the participant's determination on the consecutive nodes, and sends the consolidated information to the operating computer terminal 20 of the participant U. The participant U of the operating computer terminal 20 to which the information has been sent makes a decision based on the information and sends results of work to the workflow engine 40. The workflow engine 40 receiving the results of work performs necessary processing for each node based on the information sent from the participant U to advance the workflow.

In such a configuration of the workflow system, when there is a participant also serving as a superior of himself or herself, information necessary for processing consecutive nodes such as to give approval to the consecutive nodes is consolidated on the side of the workflow engine 40 and provided all together to the participant. It allows the same participant U to complete the work on his or her consecutive nodes at a time. In other words, when nodes to be processed by the participant U are in consecutive order, if work selected for the first node is applicable to the following nodes, all pieces of necessary information are provided to the participant U in the embodiment. Further, in the embodiment, pieces of information capable of being inputted into the consecutive nodes are all allowed to be inputted. For example, even if the level of access permission to information varies from node to node, the participant can reference information necessary for decision making. The procurement of necessary information also makes it possible to prevent errors that could occur at intermediate nodes.

As described above and according to the invention, the workflow system allows one participant to complete work on his or her consecutive nodes without repeating the same work multiple times as required in the prior art.

What is claimed:

1. A workflow system comprising:
   one or more computer terminals executing a workflow; and
   a workflow server comprising at least one processor and a memory, the workflow server connected with said one or more computer terminals in a network to manage the workflow, wherein said workflow server comprises program code executing in the memory of the workflow server to determine, for a participant, that the participant is required to complete a first node in the workflow and then subsequently to complete a second node in the workflow, the first node and the second node being in consecutive order in a route in the workflow, to consolidate information, in a new form for processing multiple consecutive nodes by the participant operating one of said one or more computer terminals by determining first access permissions for each field in a first form at the first node, by determining second access permissions for each field in a second form at the second node, to create the new form consolidating each field in the first form and each field in the second form based upon determining a highest-level access permission between each field of the first form and each field of the second form based upon the first access permission and the second access permission, and to send the new form with the consolidated information to the computer terminal for use by the participant in making the participant's determination.

2. The workflow system of claim 1, wherein the computer terminal replies to said workflow server results of work performed by the participant based on the consolidated information in the new form sent from said workflow server.

3. The workflow system according to claim 2, wherein said workflow server performs individual processing on each of the multiple nodes based on the results of work performed by the participant and sent from the computer terminal to advance the workflow.

4. The workflow system of claim 1, further comprising:
a storage device coupled to the workflow server, the storage device storing information including at least one of a workflow definition table, a workflow instance data table, a process history table, a continuous working data table, and a user information table.

5. A workflow engine connected with multiple computer terminals to manage a workflow comprising:
an information consolidation processor comprising computer program instructions executing in memory of a computer, the processor performing determining a range of consolidating multiple consecutive nodes to be processed by a participant in the workflow,
setting access permission to each field at each node within the consolidation range,
acquiring a plurality of work items, wherein each of the plurality of work items is selectable for each node within the consolidation range,
consolidating the work items to provide the participant with consolidated information and determining, for the participant, that the participant is required to complete a first node in the workflow and then subsequently complete a second node in the workflow, the first node and the second node being in consecutive order in a route in the workflow,
generating a new form based on the access permission set by, upon determining the participant is required to process consecutive nodes, determining first access permissions for each field in a first form at the first node, by determining second access permissions for each field in a second form at the second node, creating the new form consolidating each field in the first form and each field in the second form based upon determining a highest-level access permission between each field of the first form and each field of the second form based upon the first access permission and the second access permission, and sending the participant the new form.

6. The workflow engine according to claim 5, wherein when there are multiple work items that are selectable for a certain node, if routes determined for respective work items have no inclusion relationship with one another, said information consolidation processor determines a common part of the routes as the consolidation range.

7. The workflow engine according to claim 5, wherein said information consolidation processor sets the highest level of access permission of the participant to each field defined on the form for each node as the access permission upon consolidation.

* * * * *